United States Patent [19]

Gale et al.

[11] Patent Number: 4,857,250
[45] Date of Patent: Aug. 15, 1989

[54] ONE-EXTRUSION METHOD OF MAKING A SHAPED CROSSLINKABLE EXTRUDED POLYMERIC PRODUCT

[75] Inventors: George M. Gale, Shrewsbury, United Kingdom; Aldo A. Sorio, Geneva, Switzerland

[73] Assignee: Union Carbide Corporation, Danbury, Conn.

[21] Appl. No.: 599,954

[22] Filed: Apr. 13, 1984

[51] Int. Cl.[4] ............................................. B29C 47/50
[52] U.S. Cl. .................................... 264/83; 264/174; 264/211.24; 264/236; 264/347; 264/349; 425/71; 425/113; 425/206; 425/207; 425/208; 425/382.3
[58] Field of Search ............... 264/347, 236, 349, 211, 264/209.6, 210.6, 328.6, 176 R, 211.24; 425/376 B, 382.3

[56] References Cited

U.S. PATENT DOCUMENTS

| | | | |
|---|---|---|---|
| 2,540,146 | 2/1951 | Stober | 260/41 |
| 2,810,159 | 10/1957 | Teichmann | 425/207 |
| 3,035,303 | 5/1962 | Stanley | 18/12 |
| 3,075,948 | 1/1963 | Santelli | 260/45.5 |
| 3,461,498 | 8/1969 | Ramaika | 425/207 |
| 3,646,155 | 2/1972 | Scott | 260/827 |
| 3,802,913 | 4/1974 | MacKenzie, Jr. | 117/232 |
| 3,960,802 | 6/1976 | Beers et al. | 264/349 |
| 4,058,583 | 11/1977 | Glander et al. | 264/176 R |
| 4,098,861 | 7/1978 | Bassani | 425/113 |
| 4,111,621 | 9/1978 | Otani | 425/113 |
| 4,117,063 | 9/1978 | Voigt et al. | 264/102 |
| 4,117,195 | 9/1978 | Swarbrick et al. | 427/379 |
| 4,124,336 | 11/1978 | Johnson | 425/376 R |
| 4,136,132 | 1/1979 | Poole | 260/827 |
| 4,169,679 | 10/1979 | Miller et al. | 366/76 |
| 4,228,255 | 10/1980 | Fujimoto et al. | 525/288 |
| 4,234,531 | 11/1980 | Jocteur | 264/211 |
| 4,297,310 | 10/1981 | Akutsu et al. | 264/174 |
| 4,302,409 | 11/1981 | Miller et al. | 264/45.9 |
| 4,351,790 | 9/1982 | Hochstrasser et al. | 264/174 |
| 4,365,946 | 12/1982 | Anders | 425/206 |
| 4,409,164 | 10/1983 | Brasz et al. | 264/176 R |
| 4,419,014 | 12/1983 | Gale | 366/99 |
| 4,595,546 | 6/1986 | Wheeler, Jr. | 425/208 |

FOREIGN PATENT DOCUMENTS

| | | | |
|---|---|---|---|
| 930339 | 7/1963 | United Kingdom . | |
| 964428 | 7/1964 | United Kingdom . | |
| 1303643 | 1/1973 | United Kingdom | 264/211 |
| 1475216 | 6/1977 | United Kingdom . | |
| 2090559A | 7/1982 | United Kingdom | 264/347 |

Primary Examiner—Jeffery Thurlow
Attorney, Agent, or Firm—Eugene C. Trautlein

[57] ABSTRACT

Method of and apparatus for making a shaped crosslinked extruded polymeric product by extruding compacted, melted polymer, e.g., polyethylene, into a mixer formed on or fitted to the discharge end of an extruder, injecting proportionate amounts of a mixture of compounding ingredients including olefinically unsaturated hydrolyzable silane, free-radical generator and, preferably, a silanol condensation catalyst into the compacted, melted polymer. The polymer and compounding ingredients are blended in the mixer until the silane is grafted to said polymer, and the resulting grafted polymer mixed with the silanol condensation catalyst is extruded through a die to form the product of the required final shape. The resulting product is subjected to the action of $H_2O$ until the grafted polymer is crosslinked.

17 Claims, 3 Drawing Sheets

ONE-EXTRUSION METHOD OF MAKING A SHAPED CROSSLINKABLE EXTRUDED POLYMERIC PRODUCT

BACKGROUND OF THE INVENTION

1. Field Of The Invention

The present invention relates to methods and apparatus for producing shaped, crosslinked, extruded polymeric products and more specifically relates to the production of shaped, crosslinked, extruded polyethylene products.

2. Prior Art

The preparation of graft copolymers of polyolefins such as polyethylene and hydrolyzable olefinically unsaturated silanes in the presence of a solvent, e.g., xylene, and using a peroxide or hydroperoxide catalyst is disclosed in U.S. Pat. No. 3,075,948.

The production of shaped crosslinked polyethylene is disclosed in U.S. Pat. No. 3,646,155 in which polyethylene and a hydrolyzable, olefinically unsaturated silane are first reacted in an extruder in the presence of a peroxide catalyst to form a graft copolymer which is extruded and granulated and mixed by tumbling with a blend of polyethylene and a silanol condensation catalyst made in a second extrusion. The resulting composition is extruded in a third extrusion to provide a crosslinkable composition. While it is possible to carry out the process of this patent with only two extrusions, it still involves a large amount of handling and an excessive usage of extruder time, higher operating costs and the risk of deterioration of the graft copolymer during storage. Other patents disclosing the need for similar multi-extrusions, i.e., two or more extrusions, in order to provide a crosslinkable product include: U.S. Pat. Nos. 3,802,913; 4,117,063; 4,136,132; and 4,228,255.

It is difficult, if not impossible, or impractical, to adequately mix the silane, peroxide and silanol condensation catalyst into polyethylene by injecting them into a conventional extruder and there results the formation of small gels throughout the polyethylene mass, apparently because of localized premature crosslinking in areas of high additive concentration resulting from inadequate mixing. A one-extrusion process for making a crosslinkable polyethylene is disclosed in U.S. Pat. Nos. 4,117,195 and 4,351,790, herein called the "one-step" patents. In the processes of these patents, polyethylene, hydrolyzable unsaturated silane, free-radical generator and a silanol condensation catalyst are fed into the hopper of barrel of a specially designed, complex and expensive extruder. Extruders usable in the one-step process are substantially longer at 30:1 length to diameter ratio which is substantially longer than the 20:1 or 24:1 length to diameter of the majority of conventional extruders now in use. Additionally, a special extruder screw design as disclosed in British Pat. No. 964,428 is needed in the one-step process. In this special screw design, the material to be extruded is forced over the flight of the screw from a rapidly-converging blind passage into a very slowly converging passage, followed by a slightly converging zone and thence through a metering zone of uniform cross-section.

Furthermore, suitable control of temperature in the extruder of the one-step process is necessary to prevent the high temperature in the metering zone (where grafting is caused to occur at relatively high temperatures of about 230° C. more or less) from creeping into the other zones to produce higher temperatures in the other zones which normally operate at about 130° C. The temperature (230° C.) used in the metering (grafting) zone of the one-step process is considerably higher than the temperature used in the grafting process of the earlier patentees, e.g., 135° C. to 140° C. in U.S. Pat. No. 3,075,948 and 180° C. to 200° C. in U.S. Pat. No. 3,646,155. The one-step process, moreover, is not readily adaptable to conventional extruders currently operated on production lines and new extruders and associated equipment must be purchased and installed in order to carry out the one-step process or difficult and expensive changes must be made if conventional extruders are converted.

Mixers are often employed at the discharge ends of extruders for the purpose of insuring the uniformity of the material being extruded. U.S. Pat. Nos. 4,169,679 and 4,302,409 disclose mixer heads adapted to be attached to the discharge end of an existing extruder forwarding screw by means of screw threads or any other means. The mixer head is disposed in the extruder barrel between the screw and the die and turns with the screw to mix the compacted, molten polymer delivered to it by the forwarding screw. A fluid additive, such as a blowing agent, can be introduced through the barrel wall to the molten polymer at the upstream end of the mixer head. Neither of these patents disclose the addition of a hydrolyzable, olefinically unsaturated silane or a peroxide activator or a silanol condensation catalyst to the polymer nor do they disclose conducting a grafting reaction in the extruder as a means for producing a crosslinkable polymer composition.

U.S. Pat. Nos. 2,540,146 and 3,035,303 illustrate the use of mixing heads constructed on the downstream end of an extruder screw upstream from the extrusion die but fail to disclose or suggest the provision of a mixer head adapted to be attached at the downstream end of an existing extruder of conducting a grafting reaction to produce a crosslinkable polymer composition.

Mixer heads which can be adapted to be fitted onto existing extruders are disclosed in U.S. Pat. No. 4,419,014 and British Pat. No. 930,339 in which the mixing elements on the facing surfaces of the rotor and stator are cavities. The molten polymer is forced by the forwarding screw through the cavities which apply a shearing, mixing action on the polymer as the rotor turns. British Pat. No. 1,475,216 discloses a mixer head that can be adapted to be fitted onto existing extruders in which the mixer head utilizes grooves and lands on the facing surfaces of the rotor and stator. None of these patents disclose or suggest the possibility of carrying out the grafting reaction in the mixer head to produce a crosslinkable polymer composition.

SUMMARY OF THE INVENTION

This invention is based on the unexpected discovery that the grafting reaction of a hydrolyzable, olefinically unsaturated silane onto a polymer such as polyethylene can be carried out in a mixing head mounted on and powered by an extruder and to which the polymer, in compacted, melted form, is fed by the extruder. While the compacted, melted polymer is fed to the mixer, compounding ingredients including the silane, a free-radical generator to initiate the grafting reaction in the mixer and, preferably, a silanol condensation catalyst to catalyze the subsequent crosslinking reaction are injected into the compacted, molten polymer just before or just after it is fed into the mixing head. The silanol condensation catalyst can be added with the compound ingredients, or further downstream in the mixer or can be added to the polymeric material after extrusion. The invention is also based on the discovery that it is not necessary to pass the silane, free-radical activator and polymer through the entire length of an extruder in order to carry out the grafting reaction to the extent required to form a crosslinkable composition. It was also discovered that, in the method of the present invention, it is not necessary to use more than one extrusion, i.e., it is not necessary to extrude the polymer, silane and free-radical catalyst to form the grafted copolymer and then extrude the resulting grafted copolymer with a silanol condensation catalyst to form the crosslinkable composition. It was furthermore discovered that, pursuant to this invention, it is not necessary to use the special types of extruders heretofore required by the one-step process nor are special temperature controls necessary as previously required in the one-step process. The present invention is highly advantageous in permitting the conversion of existing extruders of the conventional type to the production of shaped crosslinkable polymer products and avoids the excessive expenses of purchasing, and installing specialized extruders and complex extruder controls as is the case with the one-step process.

The method of this invention produces a shaped, crosslinked, extruded, polymeric product by the steps comprising:

(a) feeding a thermoplastic polymer capable of being cross-linked by a hydrolyzable olefinically unsaturated silane into the feed zone of an extruder having a forwarding screw and a barrel in which the screw is positioned and rotated to advance the polymer through the barrel;

(b) compacting and melting the polymer in the barrel;

(c) passing the resulting compacted, melted polymer through an extruder mixer positioned at the discharge end of the extruder, the mixer having a hollow stator in axial alignment with the discharge end of the barrel to receive compacted, melted polymer therefrom and a rotor positioned within the stator in axial alignment with the screw and rotatable thereby within the stator, the surface of the rotor facing the stator being formed with mixing elements subjecting the compacted, melted polymer passing through the mixer to high shear mixing action;

(d) injecting proportionate amounts of compounding ingredients comprising a hydrolyzable olefinically unsaturated silane, a free-radical generator and, preferably, a silanol condensation catalyst into the compacted, melted polymer after compacting and melting the polymer in the extruder barrel;

(e) blending the compounding ingredients and the compacted, melted polymer in the mixer until the hydrolyzable silane is grafted to the polymer;

(f) extruding the resulting mixture out of the mixer through an extruder die to form a product of the required final shape; and (g) subjecting the product to the action of $H_2O$ in the presence of a silanol condensation catalyst until the polymer therein is crosslinked.

The apparatus used to carry out the method of this invention comprises an extruder having:

(a) a hollow barrel;

(b) a forwarding screw rotatably mounted in the barrel to advance a thermoplastic polymer therethrough and to compact and melt the polymer therein;

(c) an extruder mixer positioned at the discharge end of the extruder, the mixer having a hollow stator in axial alignment with the discharge end of the barrel to receive compacted, melted polymer therefrom, and a rotor positioned within the stator in axial alignment with the screw and rotatable thereby within the stator, the surface of the rotor facing the stator being formed with mixing elements for subjecting the compacted, melted polymer passing through the mixer to rapid distributive mixing action;

(d) injection means positioned in the upstream end portion of the stator for injecting fluid compounding ingredients into the compacted, melted polymer passing through the stator, the injection means having a discharge tip disposed below the surface of the compacted, melted polymer flowing through the stator; and (e) one-way valve means connected to the injection means to allow the flow of compounding ingredients into the compacted, melted polymer but prevent flow out of the stator into the injection means.

The invention is concerned with the crosslinking of polyethylene extrusions by the injection of a special silane formulation into molten polyethylene and by incorporating it into the molten polyethylene by using a mixing device retro-fitted to a conventional plastics extruder. A preferred mixing device is known as a cavity transfer mixer which very rapidly incorporates the silane formulation so that uniform grafting of the silane onto the polyethylene takes place within the mixer. The mixing device is easily fitted onto conventional extruders enabling extrusion companies to adapt existing extrusion lines to produce crosslinked polyethylene products, the grafted extrusions being crosslinked by exposure to water. The products are principally pipes and cables but other products which benefit from higher service temperature capabilities; for example foam, film, profiles, sheets, beams, rods and the like, may also be made by this method of this invention.

The method of this invention is not confined to extrusions, e.g., cable insulation and pipe, but may be used also for blow moldings and injection moldings.

Polyethylene is well suited to the manufacture of cold water pipes. The low heat distortion temperature of uncrosslinked polyethylene, however, restricts its applications to low temperature uses. Crosslinked polyethylene pipes can be used for hot water services; such applications being covered by DIN 16892 standard and Avis 14+15/81-100. Crosslinked polyethylene pipes made by existing crosslinking processes are costly because:

(1) Straight peroxide crosslinking (i.e. no grafted silane crosslinker) has a low output rate and uses large amounts of peroxide.

(2) The two stage silane process (e.g. U.S. Pat. No. 3,646,155) is expensive to operate.

(3) The one stage silane process (e.g. U.S. Pat. No. 4,117,195) requires very high capital cost equipment.

The availability of low cost machinery for the one stage silane process would overcome these problems and generally increase the application of crosslinked polyethylene pipes for hot water uses. Furthermore, if an under-utilised polyethylene cold water pipe extrusion plant could be easily adapted to produce crosslinked polyethylene hot water pipes, then manufacturing costs for hot water pipe would be comparable with that of pipe for cold water service.

This problem has been solved by the present invention by the injection of a silane formulation into a mixing device fitted between the extruder and die of a conventional polyethylene pipe extruder such that the silane formulation is very rapidly incorporated into the polymer melt and grafting of the silane to the polymer is achieved within the mixer. The rapid incorporation and grafting can be satisfactorily achieved by using a cavity transfer mixer as described in U.S. Pat. No. 4,419,014 fitted with an injector having a non-return valve for injecting the silane formulation. The present invention enables the production of crosslinked polyethylene (XLPE) extrusions such as pipes for hot water applications on extrusion lines originally used or intended for the extrusion of non-crosslinked polyethylene. This had not been previously technically and economically feasible.

The present invention can be applied also to the extrusion of cable-insulation and sheathing, film, foam, profiles, rods, beams and sheets to increase temperature resistance as well as mechanical properties, physical properties, stress cracking resistance, and resistance to gas and moisture permeability in polymers such as polyethylene.

Figure 1:
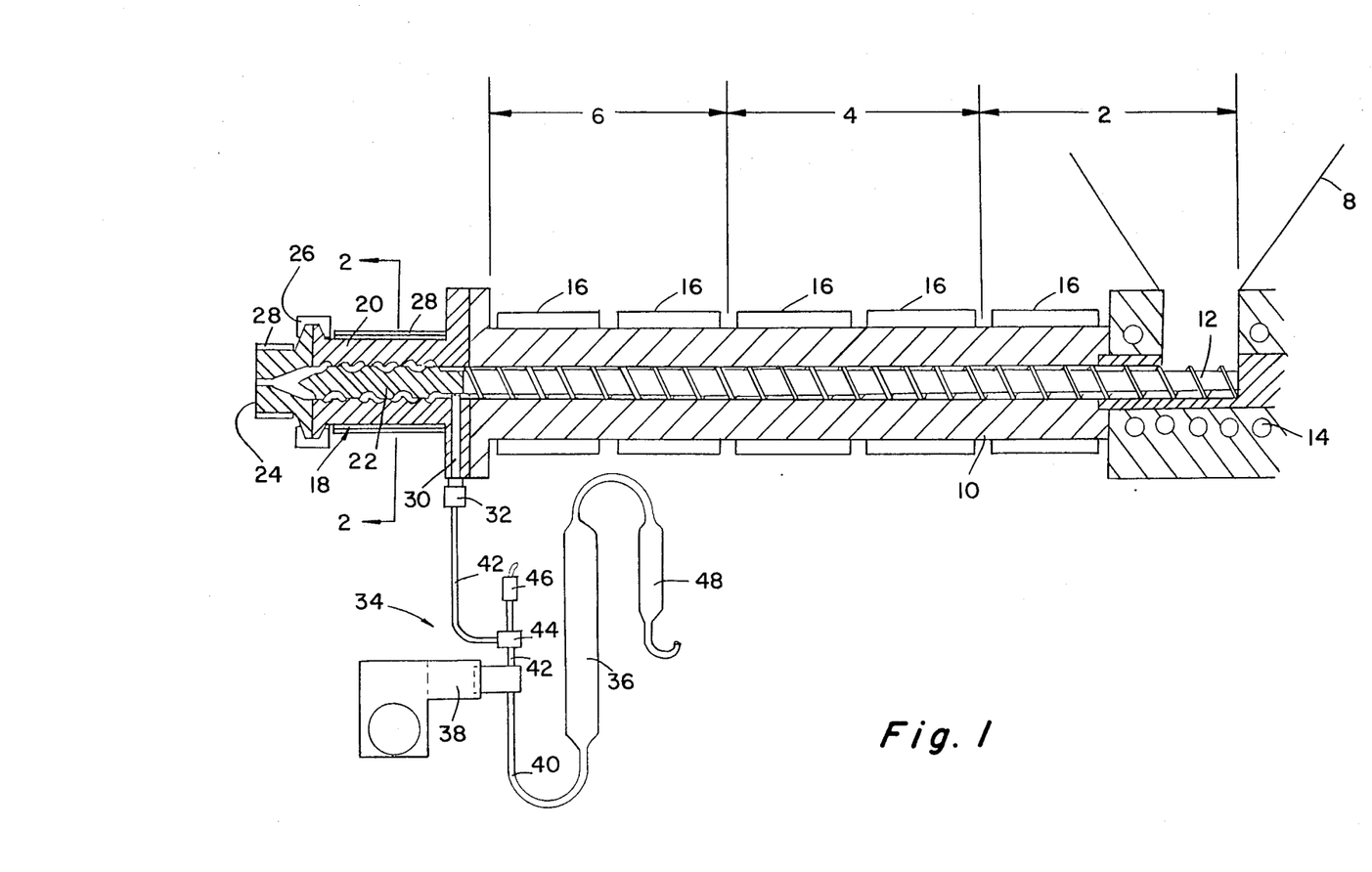
FIG. 1 is a diagrammatic partial view in longitudinal section of an extruder to which is attached a cavity transfer mixer shown in longitudinal section having an injector for injecting material into the upstream end of the mixer.

FIG. 1 illustrates an extruder having a feed-transport zone 2, a compression-melting zone 4, and a metering-pumping zone 6. The extruder comprises a hopper 8, a barrel 10 and a forwarding screw 12. The extruder is also provided with cooling means 14 at the upstream portion of the feed-transport zone 2, and separate heating and cooling units 16 around the downstream portion of the feed-transport zone 2, the compression melting zone 4 and the metering-pumping zone 6 for the purpose of controlling the temperatures in the various zones.

A mixer 18 is mounted on the downstream end of the extruder and comprises a stator 20 bolted to the barrel 10 and a rotor 22 fixed to the forwarding screw 12, as by screw threads (not shown), to rotate with the screw 12. A die 24 is fixed to the downstream end of the mixer 18 by means of a clamp 26 or other suitable means and heating units 28 are provided around the stator 20 and die 24. The mixer 18 can be of any conventional type and is here shown as a cavity transfer mixer of the type described in detail in U.S. Pat. No. 4,419,014.

An injector 30 passes through the upstream wall of the mixer 18. The outer end of the injector 30 is connected to a one-way valve 32 which is connected to a delivery system 34 for the compounding ingredients including the hydrolyzable, olefinically unsaturated silane, free radical generator and silanol condensation catalyst. The delivery system as shown in FIG. 1 comprises a reservoir 36 containing the compounding ingredients, a pump 38 and tubing 40 connecting the outlet of the reservoir 36 to the inlet of the pump 38. The reservoir 36 is provided with a suitable volumetric and gravimetric control (not shown). For laboratory trials a burette is a convenient reservoir. The outlet of the pump 38 is connected by tubing 42 through a T-connector 44 to the inlet of one-way valve 32. The T-connector is also connected to a pressure transducer 46 which is connected to a recording instrument (not shown). The space above the compounding ingredients in the reservoir 36 is vented through a dessicant-filled container 48 to the atmosphere.

Figure 2:
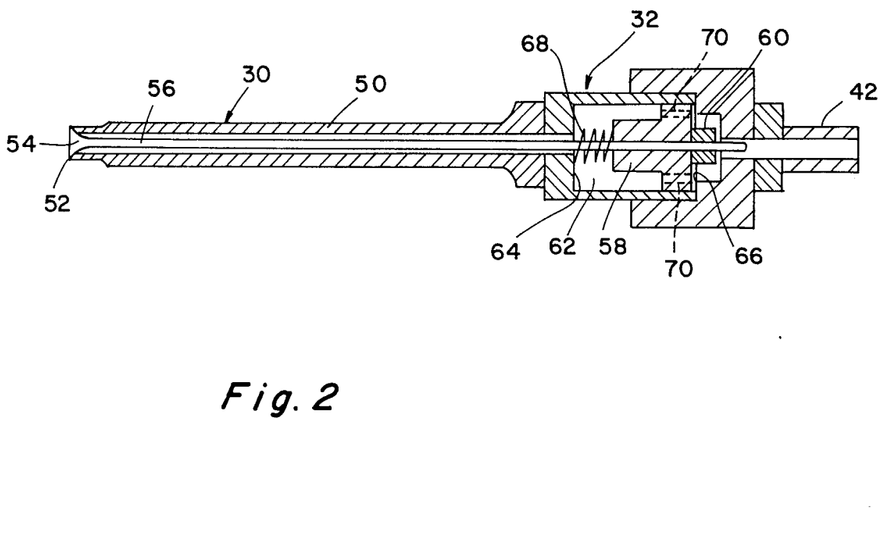
FIG. 2 is an enlarged sectional view of the injector illustrating the one-way valve means.

Referring to FIG. 2, there is shown in enlarged section in injector 30 connected to the one-way valve 32. The injector 30 comprises a long tube 50 of sufficient length to pass completely through the wall of stator 20 and terminate very close to the rotor 22 such that the inner tip 52 of the injector is well below the surface of polymeric material flowing in the space between the rotor 22 and stator 20. The inner surface of the tip 52 is formed on its inner end with a valve seat that mates with a valve head 54 disposed on the inner end of a long stem 56 that extends coaxially through said tube. The outer end of the stem 56 is fixed to a slide 58, as by screw threads (not shown) and a lock nut 60. The slide 56 is slidably mounted in a chamber 62 and is adapted to slide between the forward wall 64 of the chamber 62 and its rearward wall 66. A coil spring 68 is positioned coaxially with stem 56 and bears upon the slide 58 and forward wall 64 to bias the slide 58 and stem 56 outwardly and cause the valve head 54 to seat against the valve seat on tip 52. When the force of pressure within tube 50 acting on the inner surface of valve head 54 exceeds the force of pressure bearing on the outer surface of said valve head and the bias force of the coil spring 68, the valve head 54, valve stem 56 and slide 58 move to unseat the valve head from the seat on tip 52 and thereby open the valve and permit flow of fluid out of the tube 50 into the polymeric material occupying the space between the rotor 22 and stator 20. The outer end of chamber 62 is connected to tubing 42 which is connected to pump 38 which delivers fluid compounding ingredients to the chamber 62. Bores 70 are provided through slide 58 to permit passage of fluid past the slide 58.

Figure 3:
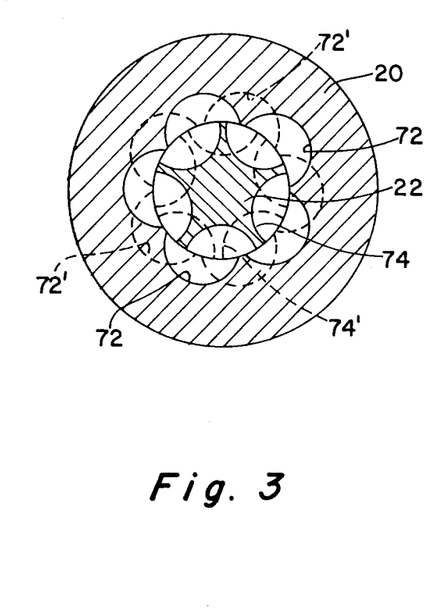
FIG. 3 is an enlarged sectional view on lines 2—2 of FIG. 1 illustrating the cavities in the inner surface of the hollow cylinder stator member of the mixer and in the outer surface of the cylindrical rotor member of the mixer which is adapted to rotate within the stator member.

The mixer 18 can be of any conventional type and is shown in the drawings as a cavity transfer mixer described in detail in U.S. Pat. No. 4,419,014, the disclosure of which is incorporated herein by reference. FIG. 3 illustrates the arrangement of cavities 72 around the inner circumference of the stator 20 and the cavities 74 around the outer circumference of rotor 22. The facing surfaces on the stator 20 and rotor 22 are formed with respective pluralities of semispherical cavities 72 and 74 respectively. The cavities 74 on rotor 22 are disposed in a plurality of circumferentially extending rows. The adjacent rows of cavities on the rotor are circumferentially displaced such that the center of each cavity 74 in a given row lies midway between the centers of the two nearest cavities 74' in each adjacent row. This can best be seen in the developed view of FIG. 4, wherein circles 74a, 74b and 74c represent cavities in one row in the rotor, circles 74a', 74b' and 74c' represent cavities in the adjacent row on one side and 74a", 74b" and 74c" represent cavities in the adjacent row on the other side. In a similar manner, the cavities 72 on the stator 20 are disposed in a plurality of circumferentially extending rows, adjacent rows on the stator being displaced such that cavities 72 in a given row are offset by half the distance between the centers of the two nearest cavities 72' in each adjacent row.

Figure 4:
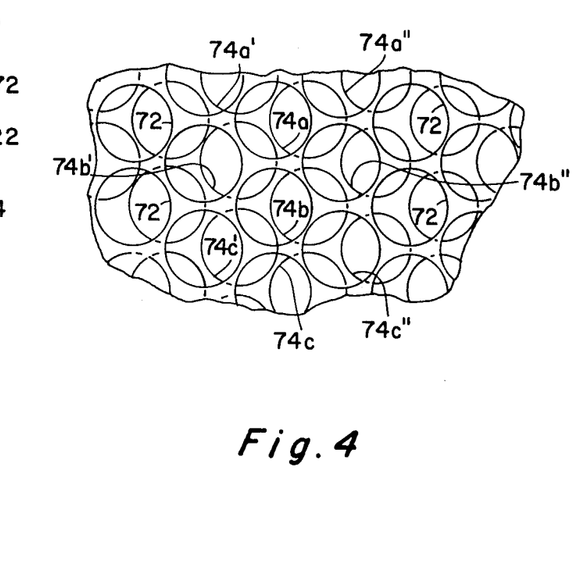
FIG. 4 is a developed view of part of the rotor and stator illustrating the axial offset and circumferential offset of the rows of hemispherical depressions in the rotor and stator.

In addition, FIG. 4 also illustrates the axial offset of the circumferential rows of cavities 72 on the stator 20 in relation to adjacent circumferential rows of cavities 74 on the rotor 22. More specifically, the circumferential line joining the centers of any given row of cavities 72 on the stator 20 lies midway between the two circumferential lines on either side of it joining the centers of cavities 74 on the rotor 22. The cavities 72 and 74 overlap such that molten polymer passing from the extruder barrel 10 to the die 24 is subjected to laminar shear within the cavities and cut and turned as it passes backwards and forwards between cavities on the rotor 22 and stator 20. Any overlapping cavity configuration can be used, but hemispherical cavities provide good streamlining and minimal restriction to flow of polymer melt. Preferably, the injector 30 is so positioned that the tip 52 is located just upstream from the most upstream cavity or at the most upstream circumferential row of cavities 74 on the rotor 22.

In operation, the extruder is operated in a normal fashion by loading polymeric material, e.g., polyethylene pellets, into the hopper 8 where it is fed to the feed-transport zone 2 which delivers it to the compression and melting zone 4 where it is converted to a compacted melted polymeric material. The compacted, melted polymeric material is delivered to the metering-pumping zone 6 and thence into the mixer 18. Compounding ingredients are pumped, in appropriate amounts, from the reservoir 36 through the injector 30 into the compacted, melted polymeric material as it enters the mixer 18. The compounding ingredients and compacted, melted polymeric material are rapidly and well mixed in the mixer 18. It was unexpectedly found that residence time and temperature in the mixer 18 can be provided to generate free radical sites in the polymeric material and complete grafting of the silane onto the polymeric material to a sufficient extent to allow an adequate extent of crosslinking upon subsequent exposure to water. It was also surprising to find that mixing of the molten polyethylene and the compounding ingredients can be achieved adequately in the relatively short mixer to provide relatively uniform mixing and no troublesome formation of small gels. The grafted polyethylene then travels through the die 24 and through cooling and haul-off systems as normally used for polyethylene extrusion. The extrusion is then exposed to hot water or moist conditions in known ways until the grafted polymer is adequately crosslinked.

It has been found that the rotational speed of the forwarding screw 12 can be varied over a wide range, e.g., from 30 to 105 rpm for a 38 mm diameter forwarding screw. Also, the temperature in each of the three zones can be varied over wide ranges and basically depends upon the melting characteristics of the polymeric material being extruded. For example, in the case of polyethylene the temperature of polyethylene in the feed-transport zone 2 can range from 100° C. to 145° C., and the temperature of the material in the compression-melt zone 4 should be higher than the temperature of the material entering said zone and of course above the melting point of the polyethylene, and can range from 135° C. to 155° C. The temperature of the polyethylene in the metering-pumping zone 6 is higher than the temperature of the material entering said zone and can range from 145° C. to 180° C. Representative temperatures of the polyethylene in the mixer 18 can be varied over a wide range of 145° C. to over 210° C., typically being, of course, higher than the temperature of the material entering the mixer. These temperatures are based on readings taken from controller thermocouples (not shown) fitted into the metal of the extruder barrel 10 but the polymer melt temperature could be higher as a result of mechanically produced heat. The temperature of the polyethylene leaving the die 24 need not exceed the temperature of polyethylene entering the die, and representatively range from 155° C. to 250° C. The output rate depends largely on the type and size of extruder used and, for a 38 mm diameter extruder operating at a screw speed in the above-mentioned range, can range from 25 grams per minute or less to 350 grams per minute or more.

The proportion of hydrolyzable, olefinically unsaturated silane based on the weight of polymeric material, e.g., polyethylene, also is not narrowly critical and can range from 0.1 to 10 wt. %, preferably 0.7 to 3 wt. %, of silane based on the total weight of polymeric material. The amounts of free radical generator also is not narrowly critical and can be varied over wide ranges, for example, from 0.01 wt. % to 0.3 wt. %, preferably 0.05 to 0.2 wt. %, based on the total weight of polymeric material. Furthermore, the proportion of silanol condensation catalyst is not narrowly critical, illustratively ranging from 0.01 to 0.2 wt. %, preferably 0.02 to 0.08 wt. %, based on the total weight of polymeric material.

Polymers that are suitable for grafting and crosslinking by the present invention include the polymers of alpha-olefins having 2 to 6 carbon atoms such as ethylene, propylene, 1-butene; 1-pentene; 1-hexene; isobutylene; 2-methyl-1-butene; 3-methyl-1-butene; 2,2-dimethylpropene; 2-methyl-1-pentene; 3-methyl-1-pentene; 4-methyl-1-pentene; 2,2-dimethyl-1-butene; 2,3-dimethyl-1-butene; 3,3-dimethyl-1-butene; and 2-ethyl-1-butene. The olefin polymer reactant employed in the invention is either a homopolymer of an alpha-olefin having 2 to 6 carbon atoms or a copolymer of two alpha-olefins, e.g., copolymers of ethylene and propylene. Modified poly-alpha-olefins such as chlorinated polyethylene can be used in this invention. Any polymer that is capable of being extruded and is capable of being crosslinked by a hydrolyzable olefinically unsaturated silane is suitable for use in this invention. In addition to polyethylene, any polymer or copolymer chemically suitable for silane crosslinking can be used, or blends of such polymers. Further, examples are ethylene-vinyl acetate copolymers, polyamides and ethylene-propylene rubbers.

Hydrolyzable olefinically unsaturated silanes suitable for grafting onto and crosslinking the polymers according to this invention include organofunctional silanes of the general formula:

$$R(CH_2CH_2CH_2)_m Si(R_1)_{3-n} X_n$$

wherein R represents a monovalent olefinically unsaturated hydrocarbon or olefinically unsaturated hydrocarbonoxy group which is reactive with the free radical sites generated in the polymer by the free radical generator, $R_1$ represents an hydrolysable organic group such as an alkoxy group having 1 to 12 carbon atoms (e.g. methoxy, ethoxy, butoxy), aralkoxy groups (e.g. phenoxy), aliphatic acyloxy groups having 1 to 12 carbon atoms (e.g. formyloxy, acetoxy, propionoxy), oxymo or substituted amino groups (alkylamino and arylamino), X represents a monovalent alkyl, aryl or aralkyl group (e.g. ethyl, methyl, propyl, phenyl, benzyl), m is 0 or 1 and n is 0, 1 or 2.

Some representative examples of the unsaturated silanes applicable in the present process are vinylmethyldimethoxysilane, vinyltriethoxysilane, vinyltrimethoxysilane, allyltriethoxysilane, allylmethyldiethoxysilane, allyltriethoxysilane, diallyldimethoxysilane, allylphenyldiethoxysilane, methoxyvinyldiphenylsilane, dodecenylvinyldipropoxysilane, didecenyldimethoxysilane, didodecenyldimethoxysilane, cyclohexenyltrimethoxysilane, hexenylhexoxydimethoxysilane, vinyl-tri-n-butoxysilane, hexenyltri-n-butoxysilane, allyldipentoxysilane, butenyldodecoxysilane, decenyldidecoxysilane, dodecenyltrioctoxysilane, heptenyltriheptoxysilane, allyltripropoxysilane, divinyldiethoxysilane, diallyldi-n-butoxysilane, pentenyltripropoxysilane, allyldi-n-butoxysilane, vinylethoxysilane, sec.-butenyltriethoxysilane, 5-benzyl-6-(dinonoxysilyl)-1-hexene, 4-phenyl-tri-(5-propoxysilyl)-1-pentene, 2-cyclopentyl-3-silyl-1-propene, 0-(trimethoxysilyl) styrene, 0-diphenoxysilyl)-p-octylstyrene, 0-(benzyloxydichlorosilyl)-0'-methylstyrene, 3-(tripropoxysilyl)-5-methylvinylcyclohexane, 5-cyclohexyl-6-(triethoxysilyl-1-hexene, (methylcyclopentenyl) dibutoxysilane.

Preferably the silanes will contain two or three hydrolysable organic groups and a vinyl or allyl group as the group reacting with the free radical sites formed in the polymer by the free radical generator.

As the free radical generating compound there may be used any compound which is capable of producing free radical sites in the polymer, the reaction conditions depending on temperature and retention time in the CTM needed for achieving a suitable half life time. The preferred free-radical initiators are organic peroxides and peresters such as tert.-butylperoxyneodecanoate, tert.-butylperoxyneohexanoate, tert.-amylperoxypivalate, tert.-butylperoxypivalate, bis (3,5,5-trimethylhexanoyl) peroxide, bis (2-methylbenzoyl) peroxide, didecanylperoxide, di-octanoylperoxide, di-lauroylperoxide, tert.-butylperoxy-2-ethylhexanoate, tert.-butylperoxy diathylyacetate, tert.-butylperoxybutyrate, 1,1-di.tert.-butylperoxy-3,5,5-trimethylcyclohexane, 1,1-di.tert.-butylperoxy cyclohexane, tert.-butylperoxy-3,5,5-trimethylhexanoate, tert. butylperoxy isopropylcarbonate, 2,2-di.tert.-butylperoxy butane, tert.-butylperoxy stearylcarbonate, tert.-butylperoxy acetate, tert.-butylperoxy benzoate, 4,4-di.tert. butylperoxy-n-butylvalerate, dicumylperoxide, bis (tert. butylperoxyisopropyl) benzene, di.tert. butylperoxide, 2,2-azo bis (2,4-dimethylvaleronitrile), azo-bisisobutyronitrile, dibenzoylperoxide, 2,5-dimethyl-2,5-bis (tert.-butylperoxy) hexane, tert. butyl peroctoate, tert. butyl perbenzoate and tert. butylcumylperoxide as well as combinations thereof.

Silanol condensation catalyst used for the crosslinking of the polymer under the influence of water molecules are metal carboxylates, such as for example: dibutyltin dilaurate, dioctyltin dilaurate, stannous acetate, stannous octoate, dibutyltin dioctoate, di-octyl tin-bis (isooctylmaleate), di-octyl-tin-bis (isooctylthioglycolate), as well as organometal compounds such as the titanium esters and chelates, for example, tetrabutyl titanate, tetranonyl titanate, and bis (acetylacetonyl) di-isopropyl titanate, organic bases, such as, ethylamine, hexylamine, dibutylamine, and piperidine, and acids, such as, fatty acids and meneral acids.

Further additives which can be incorporated into the hot polymer melt through the injector into the mixing head (e.g., the cavity transfer mixer, CTM) are any of the antioxidants and heat stabilizers commonly used in the processing of polyolefines and combinations thereof. In addition, minerals for improving flame retardancy or as an internal source of water for the crosslinking, e.g. aluminum trihydrate, zeolite or minerals like carbon black, chalk, talc, mica, silica, silicates and others, can be injected into the polymer as it enters the mixing head or CTM. The silanes and other additives can be metered into the mixing head or CTM separately or preferably, as a more efficient way, as pre-manufactured binary, ternary, or quaternary formulations. Such formulations contain the silane and condensation catalyst or free radical initiators or inhibitors or stabilizers or combinations thereof. The silanes alone or as binary, ternary, quaternary formulations with the free radical initiators, condensation catalysts, antioxidants, etc. can be used for the pre-treatment of the above-mentioned minerals (aluminum trihydrate, zeolite, silica, etc.). These pre-treated fillers can be then more easily incorporated into the hot-melt through the CTM mixing head. The system of this invention can be modified to allow the incorporation of other additives, both liquids and solids, injected either with the silane mixture, by a separate pump or through a separate open port. If the addition is made separately after the silane, the mixer can be extended with a CTM configuration, or alternative mixing device, for example, a pinned mixer, a screw, or a static mixer. Furthermore, the products can be manufactured pursuant to this invention using a molten polymer pumping process and the mixer can be driven by the polymer pumping screw or it can be driven separately. Twin screw extruders can also be used with these various configurations.

EXAMPLES

The following examples are presented. The extruder used in each example is illustrated in FIG. 1 and is a Bone Bros. single screw extruder having a barrel diameter of 1.5" (38 mm), a screw length of 36" (915 mm), a screw L/D of 24:1, a feed-transport zone length of 8D (12", 305 mm), compression-metering zone length of 8D (12", 305 mm), a metering-pumping zone length of 8D (12", 305 mm), a channel depth in the feed-transport zone of 0.248" (6.3 mm), a channel depth in the metering-pumping zone of 0.083" (2.1 mm), a nominal compression ratio (depth ratio) of 3:1, a pitch of 1D and a 7.5 horsepower, variable speed AC commutator motor. The extruder barrel is provided in the three zones with 3 term temperature controllers operating electrical resistance heating and proportional cooling for each of the three zones.

The mixer employed in the example is diagrammatically shown in the drawings and described in U.S. Pat. No. 4,419,014. Each of the stator and rotor used has seven circumferential rows with five cavities in each row. The mixer used has a nominal diameter of about 1.5 inch (38 mm) and a nominal L/D ratio of 4:1. In each example, an 8 mm diameter strand die having a streamlined entry was used. In each example, the compounding ingredients were injected through the non-return valve 32 and injector 30 shown in FIGS. 1 and 2 and the tip 52 of the injector was positioned below the surface of the melt flowing into the mixer. A Bran and Lubbe pump was used to pump the compounding ingredients through the one-way valve and injector. The compounding ingredients used in the examples is called crosslinking formulation, referred to as "XL Form." in the examples, and contained 89 wt. % vinyltrimethoxysilane, 8 wt. % dicumylperoxide and 3 wt. % dibutyltin dilaurate.

In addition, the general extrusion conditions described in the examples refer to metal temperatures of the barrel at B1, B2 and B3. These temperatures were measured at the midpoint of each of the feed-transport zone 2, compression-melting zone 4 and metering-pumping zone 6, respectively. Also, the temperature given for the CTM, i.e., the cavity transfer mixer, is a metal temperature measured at the midpoint of the CTM. Similarly, the die temperature is a metal temperature measured at the midpoint of the die. The pump pressure given is the pressure generated by pump 38 in the crosslinking formulation being pumped through tubing 42, one-way valve 32 and injector 30.

In the examples, samples of the extrudate from the die and samples of extrudate taken from three bleed ports 1, 2 and 3 located at, respectively, the second, fourth and sixth circumferential rows of cavities, were tested for crosslink density by xylene extraction. In this test, shavings of the extrudate were taken, weighed and placed into 100 ml of xylene which was boiled for seven hours after which the resulting material was vacuum filtered on the preweighed filter paper to recover all of the residue remaining undissolved in the xylene. The residue represents the crosslinked portion of the extrudate and the dissolved portion represents the uncrosslinked portion. The weight percent of insoluble material, i.e., crosslinked polymer, in the extrudate is calculated by dividing the weight amount of residue by the weight amount of initial sample placed into the xylene and multiplying by 100.

The test results given in the tables of the examples designated "Residue (dry) G (%)'" provides the hot xylene extraction test results on samples of extrudate that were measured and immediately stored in a desiccator to avoid any contact with moisture; the G standing for grafted composition and implying little or no crosslinking because of the avoidance of any contact with moisture. The designation "Residue (wet) XL (%)" refers to the hot xylene test results performed on samples of the extrudate that were simply stored in a polyethylene bag until testing and which, prior to testing, were boiled in water for four hours to crosslink the grafted polymeric material prior to subjecting it to hot xylene extraction.

Additional samples of extrudate in the examples were immediately compression molded into 150×150×1 mm sheets using contact pressure at 170° C. for 5 minutes followed by the application of ten tons pressure with water cooling. Strips were cut from the resulting molded sheets and were stored for 24 hours in vacuum flasks which were filled with boiling water to crosslink the grafted polymeric material in the strips. Thereafter, dumb-bell shaped test pieces were cut from the crosslinked strips of molded sheets in accordance with BS 903, Part A2, Type 2, i.e., the dumb-bell test pieces had an overall length of 75 mm, a width of ends of 12.5±1 mm, a length of narrow parallel portion of 25±1 mm, a width of narrow parallel portion of 4.0±0.1 mm, a small radius of 8±0.5 mm, and a large radius of 12.5±1 mm. The dumb-bell specimens are then subjected to a hot deformation test pursuant to IEC 502, 1983 to determine the maximum extension under load and permanent extension of the sample. In the hot deformation test, each test piece is suspended at one end by a grip in an oven and a lower grip is attached to the lower end of each test piece for the purpose of suspending weights therefrom. In operating the test, a load of $20N/cm^2$ (N being a Newton) was applied to the test piece for 15 minutes while suspended in the oven at a temperature of 200° C. The load of $20N/cm^2$ is based on the cross-sectional area of the neck of the dumb-bell shaped test pieces. The test pieces are initially formed with spaced marker lines extending in parallel, transversely across the narrow parallel portion or neck. The initial, pretest distance separating the marker lines is 20 mm before exposure to load and elevated temperature. After 15 minutes under the load of $20N/cm^2$ at 200° C., the distance between the marker lines is measured and the increase in distance over the initial pretest distance is divided by the initial pretest distance and multiplied by 100 to give the percent extension at 200° C. which is reported as "Extn. at 200° C. (%)" in the tables of the examples. A lower percent extension at 200° C. indicates a higher degree of crosslinking and a greater percent extension indicates a lower degree of crosslinking.

After measuring the distance between the marker lines while the specimen is under the load of $20N/cm^2$ at 200° C., the load is then removed and the test pieces are allowed to recover for 5 minutes at 200° C. They then are removed from the oven and allowed to cool slowly to ambient temperature after which the distance between the marker lines is measured, from which distance the initial (pretest) distance between the marker lines is subtracted to give the mm of permanent extension imparted to the test piece. The mm of permanent extension is then divided by the initial distance between the marker lines and multiplied by 100 to give the percent permanent extension, and is reported as such in the tables. The lower the percentage of permanent extension generally indicates a higher level of crosslinking. For XLPE insulation and sheathing applications, the maximum elongation tolerable is 175% and the maximum permanent elongation tolerable is 15% according to present practices.

EXAMPLE 1

The extruder was started and medium density polyethylene (Vestolen-A4516) having a melt flow index (ISO/R1133 190/2 procedure 4) of 7 g/10 min. and (ISO/R1133 190/5 procedure 5) of 20 g/10 min. was fed to the hopper of the extruder. The density (ISO/R1183) of the polyethylene was 0.945 g/cm³. The screw speed as given in Table 1 below was set and the B1, B2, B3, CTM and die temperatures were measured and are listed in Table 1 which also provides the motor current and pump pressure for each of the screw speeds specified. The extruder output rate at each screw speed also was measured by cutting and weighing samples at 1 min. intervals and the output rate determined by this method for each screw speed is listed. Injection of the XL Formulation was then started with the pump 38 adjusted to provide the desired concentration of XL Formulation in the polymeric material given in Tables 2, 3 and 4 below. The output rate was measured again and the injection pump 38 was adjusted as necessary in order to correlate the concentration of XL Formulation injected to any changes in the output rate of polyethylene being fed to the mixer 18 by the extruder.

Following establishment of steady state processing conditions, three samples of extrudate were taken in each instance, one being stored in the desiccator for subsequent xylene extraction testing for determining "Residue (dry) G (%)", a second sample being stored in a polyethylene bag for subsequent boiling for four hours in water and subsequent xylene extraction testing to provide "Residue (wet) XL (%)" given in each instance in Tables 2, 3 and 4, and the third sample being immediately compression molded for the purpose of providing the "Extn. at 200° C. (%)" and "Permanent extension" measurements. The results of the testing and measuring of the samples at various XL Formulation concentrations and screw speeds are given in Tables 2, 3 and 4 below. Table 4 provides the test results for extrudates removed from bleed ports 1, 2 and 3 at the designated screw speeds and concentrations of XL Formulation.

The results provided in Tables 2 and 3 show that more than 50% and as high as 80% of each of the polymeric extrudate was crosslinkable and that the resulting crosslinked extrudates are acceptable for insulation and sheathing applications. The results of Table 4 show a steady increase in grafting as the polymeric material progressed through the mixer and the degree of grafting just before the polymeric material left the mixer was sufficiently high to provide 65% or more crosslinked polymer.

TABLE 1

| Screw Speed (rpm) | General Extrusion Conditions | | | | | Motor Current (amps) | Output Rate (g/min) | Pump Pressure (Bar) |
|---|---|---|---|---|---|---|---|---|
| | Temperatures (° C.) | | | | | | | |
| | Barrel | | | CTM | Die | | | |
| | B1 | B2 | B3 | | | | | |
| 30 | 130 | 158 | 168 | 181 | 180 | 5 | 63 | 22 |
| 45 | 130 | 159 | 168 | 176 | 180 | 5 | 115 | 25 |
| 60 | 130 | 159 | 169 | 177 | 181 | 5 | 150 | 23 |
| 75 | 130 | 158 | 179 | 180 | 181 | 4.5 | 208 | 26 |
| 90 | 130 | 158 | 178 | 176 | 181 | 5 | 250 | 33 |
| 105 | 130 | 158 | 170 | 177 | 181 | 6 | 281 | 34 |

TABLE 2

| | Influence of XL Formulation | | | | | | | |
|---|---|---|---|---|---|---|---|---|
| Screw Speed | 60 rpm | | | | 105 rpm | | | |
| XL Form. concn. (%) | 1.6 | 1.8 | 2.0 | 2.2 | 1.6 | 1.8 | 2.0 | 2.2 |
| Residue (dry) G (%) | 5 | 5 | 13 | 15 | 8 | 15 | 10 | 16 |
| Residue (wet) XL (%) | 67 | 56 | 67 | 71 | 67 | 77 | 71 | 72 |
| Extn. at 200° C. (%) | 150 | 67 | 45 | — | 75 | 69 | 62 | — |
| Perm. Extension (%) | 17.5 | 10 | 2.5 | — | 5 | 2.5 | 2.5 | — |

TABLE 3

| Influence of Screw Speed At 2% XL Formulation Concentration | | | | | | |
|---|---|---|---|---|---|---|
| | Screw Speed (rpm) | | | | | |
| Test | 30 | 45 | 60 | 75 | 90 | 105 |
| Residue (dry) G (%) | 24 | 16 | 13 | 12 | 7 | 10 |
| Residue (wet) XL (%) | 80 | 66 | 67 | 75 | 67 | 71 |
| Extn. at 200° C. (%) | 26 | 39 | 45 | 41 | 47 | 62 |
| Perm. extension (%) | — | — | 2.5 | 2 | 2.5 | 2.5 |

TABLE 4

| Grafting During Progress Through The Mixer | | | | | | |
|---|---|---|---|---|---|---|
| Screw Speed | 60 rpm | | | 105 rpm | | |
| Bleed Port | 1 | 2 | 3 | 1 | 2 | 3 |
| 1.6% XL Form. | | | | | | |
| Residue (dry) G (%) | 2 | 5 | 5 | 1 | 1 | 4 |
| Residue (wet) XL (%) | 35 | 64 | 76 | 10 | 67 | 74 |
| 200° C. Extn. % | F | F | 45 | F | 32 | 35 |
| 1.8% XL. Form. | | | | | | |
| Residue (dry) G (%) | 4 | 9 | 12 | 1 | 7 | 22 |
| Residue (wet) XL (%) | 20 | 47 | 65 | 29 | 78 | 81 |
| 200° C. Extn. % | F | 40 | 55 | F | 61 | — |

Note: F designates tensile failure

EXAMPLE 2

The procedure of Example 1 was carried out except that instead of the polyethylene identified therein as Vestolen A4516, a different polyethylene, namely, Unifos DFDS4444, having a melt flow index (ASTM D1238) of 2.2 g/10 min. and a density (ASTM D1928C) of 922 kg/m$^3$ was used. The general extrusion conditions are given in Table 5 and the test results are given in Tables 6, 7 and 8.

TABLE 5

| Screw Speed (rpm) | General Extrusion Conditions | | | | | Motor Current (amps) | Output Rate (g/mins) | Pump Pressure (bar) |
|---|---|---|---|---|---|---|---|---|
| | Temperature (° C.) | | | | | | | |
| | Barrel | | | CTM | Die | | | |
| | B1 | B2 | B3 | | | | | |
| 30 | 125 | 148 | 155 | 155 | 166 | 6.0 | 87 | 33 |
| 45 | 125 | 148 | 155 | 155 | 166 | 6.0 | 133 | 33 |
| 60 | 125 | 148 | 155 | 155 | 166 | 6.0 | 187 | 55 |
| 75 | 125 | 148 | 155 | 155 | 166 | 6.0 | 236 | 55 |
| 90 | 125 | 148 | 155 | 155 | 166 | 7.0 | 280 | 76 |
| 105 | 125 | 148 | 155 | 155 | 166 | 8.0 | 341 | 76 |

TABLE 6
Effect of Screw Speed at 2.0% XL Formulation Concentration

| Test | Screw Speed (rpm) | | | | | |
|---|---|---|---|---|---|---|
| | 30 | 45 | 60 | 75 | 90 | 105 |
| Residue (dry) G (%) | 24 | 15 | 25 | 21 | 19 | 20 |
| Residue (wet) XL (%) | 75 | 77 | 82 | 77 | 78 | 67 |
| Ext. at 200° C. (%) | 62 | 75 | 64 | 50 | 50 | 75 |
| Permanent extension (%) | 0 | 2.5 | 1.0 | 0 | 0 | 2.5 |

TABLE 7
Effect of XL Formulation Concentration

| | Screw Speed (rpm) | XL Formulation Concentration % | | | |
|---|---|---|---|---|---|
| | | 1.6 | 1.8 | 2.0 | 2.2 |
| Residue (wet) XL (%) | 60 | 60 | 72 | 64 | 77 |
| Residue (wet) XL (%) | 105 | 63 | 75 | 75 | 78 |

TABLE 8
Grafting During Progress Through The Mixer

| | Screw Speed | | | | | |
|---|---|---|---|---|---|---|
| | 60 rpm | | | 105 rpm | | |
| Bleed Port | 1 | 2 | 3 | 1 | 2 | 3 |
| 2.0% XL Form. Residue (wet) XL (%) | 3 | 49 | 75 | 34 | 71 | 82 |

The results given in Tables 6 and 7 show that 60% or more, as high as 82%, of the polymeric material is crosslinkable and that the resulting crosslinked extrudates are acceptable for insulation and sheathing applications. The results of Table 8 illustrate a steady increase in the crosslinkability, i.e., in the degree of grafting, as the polymeric material passes through the mixer.

EXAMPLE 3

The procedure given in Example 1 was used except that in place of Vestolen A4516 polyethylene, there was used a polyethylene identified as Unifos NEWS8019, and LLDPE which has more potentially reactive sites than other polyethylenes, having a melt flow index (ASTM D1238) of 4 g/10 min. and a density (ASTM D1928C) of 934 kg/m³. The generaly extrusion conditions are given in Table 9 and Tables 10-13 provide the results at the indicated screw speeds and XL Formulation concentrations.

TABLE 9
General Extrusion Conditions

| Screw Speed (rpm) | Temperature (°C.) | | | | | Motor Current (amps) | Output Rate (g/mins) | Pump Pressure (bar) |
|---|---|---|---|---|---|---|---|---|
| | Barrel | | | | | | | |
| | B1 | B2 | B3 | CTM | Die | | | |
| 60 | 126 | 151 | 155 | 156 | 160 | 7 | 178 | 62 |
| 75 | 126 | 151 | 155 | 156 | 160 | 7.75 | 222 | 83 |
| 90 | 126 | 151 | 155 | 156 | 160 | 8.5 | 267-271 | 90 |
| 105 | 126 | 151 | 155 | 156 | 160 | 10 | 314 | 93 |

TABLE 10
Smooth Extrusions At 90 rpm Screw Speed

| XL Form Concentration | 0 | 0.4 | 0.6 | 0.8 | 1.0 | 1.2 | 1.4 | 1.6 |
|---|---|---|---|---|---|---|---|---|
| Residue (wet) XL (%) | | 2.1 | 18.3 | 39.2 | 60.3 | 75 | 89 | 61 |
| Extension at 200° C. (%) | >200 | >200 | >200 | 185 | 45 | 40 | 22.5 | 20 |
| Permanent Extn. (%) | — | — | — | 18 | 5 | 5 | 0 | 0 |

TABLE 11

| | Residue (wet) XL (%) | | | |
|---|---|---|---|---|
| Screw Speed (rpm) | 60 | 75 | 90 | 105 |
| XL Form. concentration | | | | |
| 1.2% | 74 | 69 | 75 | 65 |
| 1.4% | 89 | 79 | 89 | 83 |
| 1.6% | 66 | 78 | 61 | 66 |

TABLE 12

| | Extension at 200° C. (%) | | | |
|---|---|---|---|---|
| Screw Speed (rpm) | 60 | 75 | 90 | 105 |
| XL Form concentration | | | | |
| 1.2% | — | 37.5 | 40 | 32.5 |
| 1.4% | 32 | 26 | 22.5 | 19 |
| 1.6% | 59 | 24 | 20 | — |

TABLE 13

| | Permanent Extension (%) After 5 Minutes Recovery Time | | | |
|---|---|---|---|---|
| Screw Speed (rpm) | 60 | 75 | 90 | 105 |
| XL Form. concentration | | | | |
| 1.2% | — | 5 | 5 | 2.5 |
| 1.4% | 7.5 | 1.25 | 0 | 0 |
| 1.6% | 10 | 0 | 0 | 0 |

The results given in Table 10 illustrates the increase in crosslinkability of polymeric extrudate as the proportion of crosslinking formulation (i.e., silane, free radical generator and silanol condensation catalyst) are increased and a crosslinkability of as much as 89 wt. % of the polymeric material is attainable and that crosslinked extrudates which have excellent hot extension properties can be made. Table 11 illustrates polymeric extrudates which are at least 61% crosslinkable and as much as 89% crosslinkable. Tables 12 and 13 illustrate the excellent hot extension properties of the polymeric extrudates identified therein.

EXAMPLE 4

The procedure of Example 1 was carried out except that instead of the polyethylene described therein there was instead used a polyethylene identified as Hoechst GF 7740F2 having a melt flow index (ASTM D 1238) of 0.5 g/min. and a density (ASTM D1928C) of 942 kg/m³.

TABLE 14

| XL Form (%) | Screw Speed (rpm) | Output Rate (g/min) | Temperatures, °C. (1) | | | | | Motor Current (amps) | Pump Pressure (bars) | Melt Temps. °C., IN | CTM(2) OUT | Residue Dry, G (%) | Residue Wet, XL (%) | Comments |
|---|---|---|---|---|---|---|---|---|---|---|---|---|---|---|
| | | | B1 | B2 | B3 | CTM | Die | | | | | | | |
| 2.0 | 30 | 75 | 132 | 173 | 187 | 209 | 191 | 5.6 | 62 | 187 | 229 | — | — | Surged badly. Surface very uneven but better during surges. |
| 2.0 | 45 | 114 | 130 | 168 | 184 | 207 | 191 | 6 | 7 | 188 | 228 | — | — | Surged ceased and surface improved but still has knobbly appearance. |
| 2.0 | 60 | 161 | 130 | 172 | 184 | 205 | 191 | 5.75 | 10 | 189 | 221 | 4.2 | 52.1 | Surging returned Surface improve but has greasy film. |
| 2.0 | 75 | 210 | 130 | 172 | 188 | 207 | 191 | 5 | 10 | 189 | 225 | — | — | Knobbly appearance |

NOTE:
(1) Metal temperatures taken on the extruder barrel, CTM and die.
(2) Temperature of the molten polymeric material at, respectively, upstream and downstream ends of CTM.

What is claimed is:

1. A method of making a shaped crosslinked, extruded polymeric product comprising:
   (a) feeding a thermoplastic polymer capable of being cross-linked by a hydrolyzable olefinically unsaturated silane into the feed zone of an extruder having a forwarding screw and a barrel in which said screw is positioned and rotated to advance said polymer through the barrel;
   (b) compacting and melting said polymer in said barrel;
   (c) passing the resulting compacted, melted polymer through an extruder mixer positioned at the discharge end of said extruder, said mixer having a hollow stator in axial alignment with the discharge end of said barrel to receive compacted, melted polymer therefrom and a rotor positioned within said stator in axial alignment with said screw and rotatable thereby within said stator, the surfaces of the rotor and stator being formed with pluralities of rows of concave cavities extending peripherally around said stator and rotor, said rows being spaced apart axially so that the rows on the stator are axially offset from the rows on the rotor and there is axial overlap of the cavities in adjacent rows on the stator and rotor, the cavities in adjacent rows on the stator being circumferentially offset and the cavities in adjacent rows on the rotor being circumferentially offset for subjecting said compacted, melted polymer passing through said mixer to high shear mixing action;
   (d) injecting proportionate amounts of compounding ingredients comprising a hydrolyzable olefinically unsaturated silane, and a free-radical generator, into said compacted, melted polymer after compacting and melting said polymer in said extruder barrel;
   (e) blending said compounding ingredients and said compacted, melted polymer in said mixer until said hydrolyzable silane is grafted to said polymer; and
   (f) extruding the resulting mixture out of said mixer through an extrusion die to form a shaped product.

2. Method as claimed in claim 1 wherein said extruded, shaped product resulting from step (f) is subjected to the action of H$_2$O in the presence of a silanol condensation catalyst until the polymer therein is cross-linked.

3. Method as claimed in claim 2 wherein said compounding ingredients include said silanol condensation catalyst.

4. Method as claimed in claim 3 wherein said polymer is polyethylene.

5. Method as claimed in claim 4 wherein said free radical generator is an organic peroxide.

6. Method as claimed in claim 4 wherein said condensation catalyst is dibutyltin dilaurate.

7. Method as claimed in claim 6 wherein said free radical generator is dicumylperoxide.

8. Method as claimed in claim 7 wherein said hydrolyzable silane is vinyltrimethoxysilane.

9. Method as claimed in claim 4 wherein said cavities are semispherical.

10. Method as claimed in claim 9 wherein compounding ingredients comprise vinyltrimethoxysilane, dicumylperoxide and dibutyltindilaurate.

11. An extruder specially adapted to provide a silane crosslinked polymeric product having
    (a) a hollow barrel;
    (b) a forwarding screw rotatably mounted in said barrel to advance a thermoplastic polymer therethrough and to compact and melt said polymer therein;
    (c) an extruder mixer positioned at the discharge end of said extruder, said mixer having a hollow stator in axial alignment with the discharge end of said barrel to receive compacted, melted polymer therefrom, and a rotor positioned within said stator in axial alignment with said screw and rotatable thereby within said stator, the surfaces of the rotor and stator being formed with pluralities of rows of concave cavities extending peripherally around said stator and rotor, said rows being spaced apart axially so that the rows on the stator are axially offset from the rows on the rotor and there is axial overlap of the cavities in adjacent rows on the stator and rotor, the cavities in adjacent rows on the stator being circumferentially offset and the cavities in adjacent rows on the rotor being circumferentially offset for subjecting said compacted, melted polymer passing through said mixer to rapid distributive mixing action;

(d) injection means positioned in the upstream end portion of said stator for injecting fluid compounding ingredients into said compacted, melted polymer passing through said stator, said injection means having a discharge tip disposed below the surface of the compacted, melted polymer flowing through said stator; and (e) one-way valve means connected to said injection means to allow the flow of compounding ingredients into said compacted, melted polymer but prevent flow out of said stator into said injection means.

12. Extruder as claimed in claim 11 wherein said cavities are semispherical.

13. The method of making a cross-linked extruded elongated product comprising:

(a) feeding into the hopper of a screw extruder which has a barrel and a screw extending from end to end of the barrel, a polymer capable of being cross-linked by the use of a liquid silane compound which comprises a hydrolyzable, olefinically unsaturated silane, a free-radical generator, and a condensation catalyst;

(b) conveying the polymer through the barrel of the extruder;

(c) heating and melting while conveying the polymer through the barrel of the screw extruder;

(d) metering and injecting a liquid silane compound comprising a hydrolyzable, olefinically unsaturated silane, a free-radical generator, and a condensation catalyst into the melted polymer;

(e) mixing and blending said silane compound and said melted polymer to obtain a uniform blended mixture thereof;

(f) extruding said blended mixture through an extrusion die to form an elongated product of a required final shape; and (g) subjecting said elongated product to the action of moisture until said polymer is cross-linked.

14. The method of making a cross-linked extruded elongated product set forth in claim 13 wherein the polymer is fed in to the hopper of the extruder in pellet form.

15. The method of making a cross-linked extruded elongated product set forth in claim 13 wherein the polymer is conveyed through said extruder by a screw having a solids channel and a melt channel separated by a barrier flight wherein the polymer is collected into the melt channel as it melts during its transportation through the extruder barrel.

16. The method of making a cross-linked extruded elongated product set forth in claim 13 wherein the liquid silane compound is injected into the polymer after substantially all of said polymer is melted.

17. The method of making a cross-linked extruded elongated product as set forth in any one of claims 13–16 wherein the liquid silane compound and the polymer are mixed and blended in a rotary cavity transfer mixer before said mixture is extruded.

* * * * *